United States Patent [19]
Piziks

[11] 3,762,238
[45] Oct. 2, 1973

[54] TRANSMISSION CONTROL
[75] Inventor: Henry I. Piziks, Saginaw, Mich.
[73] Assignee: General Motors Corporation, Detroit, Mich.
[22] Filed: Sept. 14, 1972
[21] Appl. No.: 289,001

[52] U.S. Cl. ................................ 74/485, 74/485
[51] Int. Cl. ............................................. G05g 9/12
[58] Field of Search ............... 74/473 SW, 484, 485, 74/486

[56] References Cited
UNITED STATES PATENTS

| | | | |
|---|---|---|---|
| 2,185,830 | 1/1940 | Burt | 74/473 SW |
| 2,631,467 | 3/1953 | Lincoln et al. | 74/484 |
| 2,924,988 | 2/1960 | Primeau | 74/485 X |
| 3,025,714 | 3/1962 | Bliss | 74/484 |
| 3,025,715 | 3/1962 | Grady | 74/484 |
| 3,080,769 | 3/1963 | Wilson et al. | 74/484 X |
| 3,121,344 | 2/1964 | Fodrea | 74/486 X |

Primary Examiner—Allan D. Herrmann
Attorney—Warren E. Finken et al.

[57] ABSTRACT

The drawings illustrate a simplified lower steering column transmission control system wherein the 1-R and 2-3 shift levers have mounting rings which bear against one another around the control tube, between bearings associated with the jacket, to thereby eliminate the need for any adjustment means, with an enclosed actuating pin operatively connected to the control tube cooperating with slots formed in the mounting rings to provide selective rotary movement of the 1-R and 2-3 shift levers.

5 Claims, 3 Drawing Figures

PATENTED OCT 2 1973    3,762,238
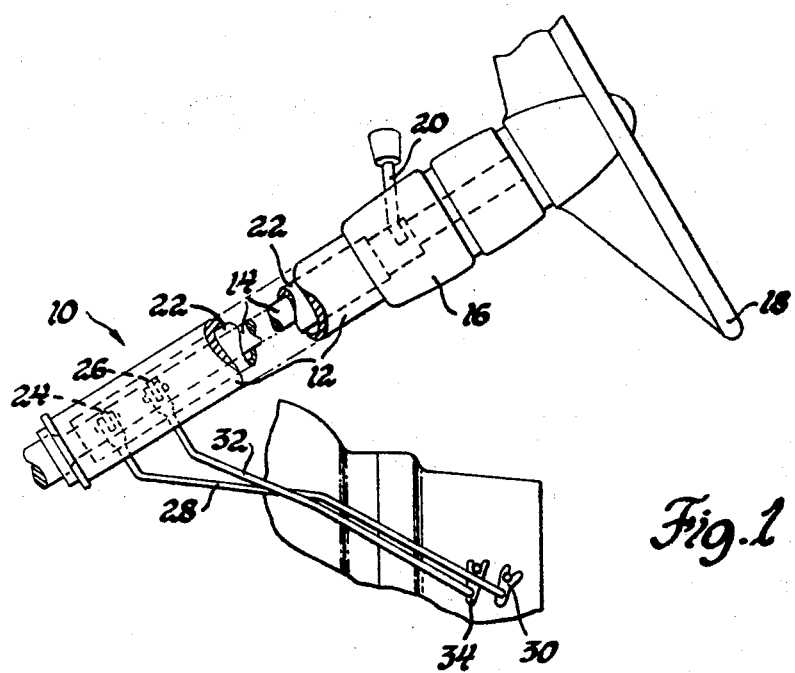
Fig.1
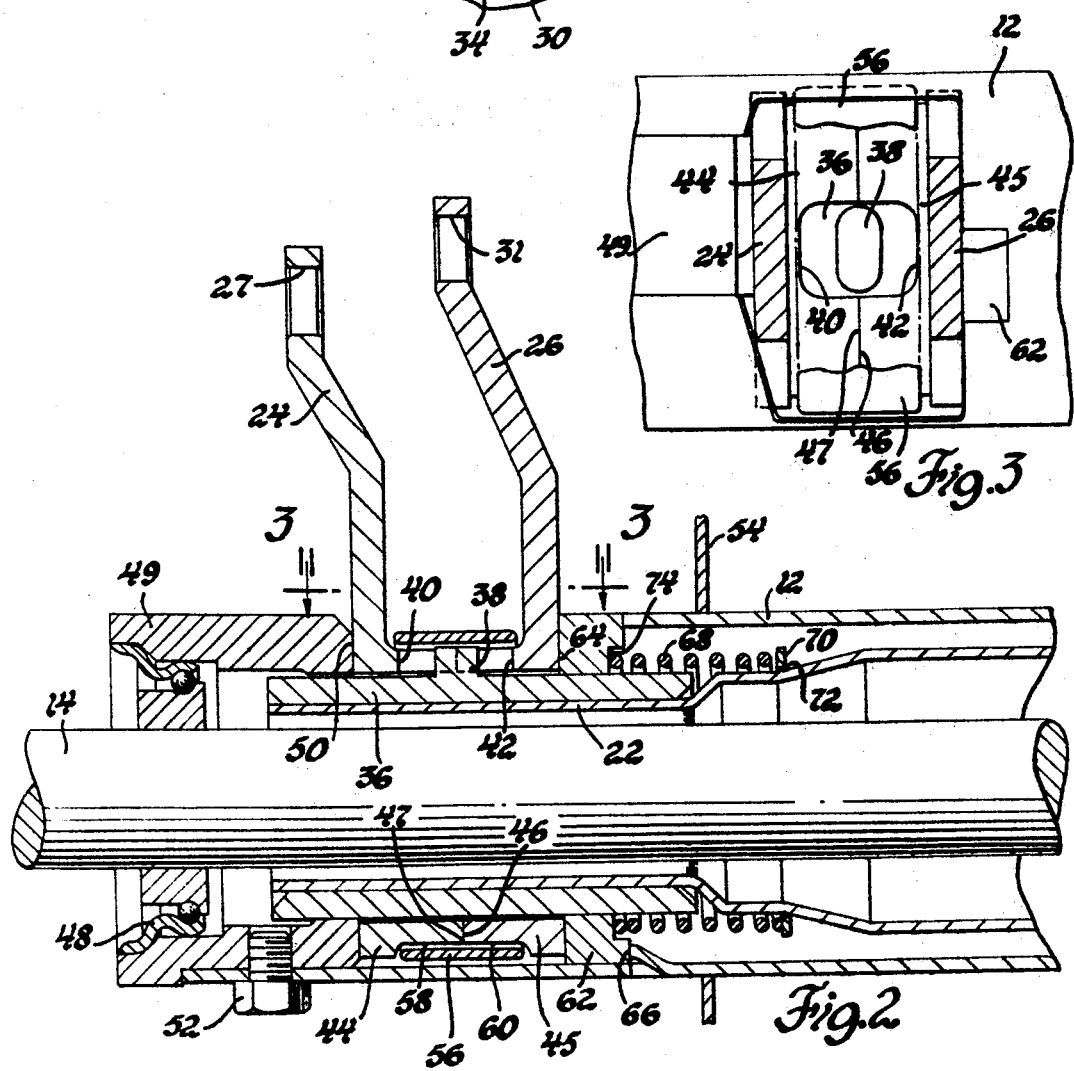
Fig.3
Fig.2

TRANSMISSION CONTROL

The invention relates generally to transmission control systems and, more particularly, to a simplified lower steering column shift control arrangement.

Conventional lower steering column shift control arrangements may include, for example, a relatively long radially extending relay lever secured to the shift control tube, intermediate the usual 1-R and 2-3 shift control levers which are generally separated by a spcer ring, and an axially movable adjustment member mounted around the lower end of the shift control tube within the jacket and adjacent either the lower or the upper shift control lever, with a plurality of bolts for securing the adjustment member to the control tube after axial adjustement thereof due to the "stack-up" of several axially aligned components.

An object of the invention is to provide an improved, simplified lower steering column shifting arrangement, wherein three bearing surfaces are associated with the 1-R and 2-3 shift control levers, such that no axial adjustment means is required in conjunction therewith.

Another object of the invention is to provide an improved lower steering column shift control means, wherein a pair of bearing rings are mounted adjacent the respective outer surfaces of the 1-R and 2-3 shift lever mounting rings which, in turn, bear against one another at their respective adjacent inner surfaces, thereby providing a minimal number of axially aligned components.

A further object of the invention is to provide an improved steering column shift control arrangement including an enclosed actuating pin formed on a sleeve member secured to the control tube, in lieu of a conventional relay lever, for reciprocal cooperation with oppositely disposed slots formed in abutting cylindrical mounting rings on which the shift control levers are formed.

These and other objects and advantages of the invention will be apparent when reference is made to the following description and accompanying drawings, wherein:

FIG. 1 is a fragmentary side view of a vehicular steering column embodying the invention;

FIG. 2 is an enlarged cross-sectional view of the lower portion of a steering column embodying the invention; and FIG. 3 is a cross-sectional view taken along the plane of line 3—3 of FIG. 2, as if FIG. 2 were a full-round view, and looking in the direction of the arrows.

Referring now to the drawings in greater detail, FIG. 1 illustrates a transmission control assembly 10 including a steering column jacket 12 which surrounds a steering shaft 14 and supports a shift bowl 16 and a steering wheel 18. A transmission shift selector lever 20 may be connected in any suitable manner, for example, as shown and described in U.S. Pat. No. 2,924,988 Primeau, for actuating a control tube 22 through rotary and reciprocating movement. The selector lever 20 is moved toward and away from the steering wheel 18 to reciprocate the control tube 22 for ratio selecting movement, and rotated about the axis of the steering column jacket 12 to rotate the control tube 22 for shifting movement. The lower end of the control tube 22 is, on reciprocal or axial movement thereof, selectively clutched to a lower or first-reverse shift control lever 24 or to an upper or second-third shift control lever 26. The lower lever 24 is connected at an opening 27 formed therein (FIG. 2) by a rod 28 to a first-reverse (1-R) shift arm 30, while the upper lever 26 is connected at an opening 31 formed therein by a rod 32 to a second-third (2-3) shift arm 34.

As illustrated in FIG. 2, a sleeve member 36 is secured by any suitable means, such as welding, to the lower end of the control tube 22. An actuating pin 38 is formed at an intermediate point along the outer surface of the sleeve 36 and extends through oppositely disposed slots 40 and 42 formed in mounting rings or cylindrical portions 44 and 45, respectively, on which the respective 1-R and 2-3 shift control levers 24 and 26 are formed. The cylindrical portions 44 and 45 are mounted freely around the sleeve 36, and abut or bear against one another at respective bearing surfaces 46 and 47. It may be noted that, upon axial movement of the actuating pin 38 via the control tube 22 and the sleeve member 36, the actuating pin 38 is selectively clutched to either the lower shift control lever 24 or to the upper shift control lever 26 by meshing with one or the other of the respective adjacent slots 40 and 42. Thereafter the respective lever 24 or 26 may be selectively rotated in first or reverse drive ratios (lever 24) or second or third drive ratios (lever 26), upon rotation of the control tube 22 by the selector lever 20.

A lower bearing 48 and lower bearing adaptor 49 (FIG. 2) are mounted on the steering shaft 14 adjacent the lower ends of the jacket 12 and the control tube 11 and the outer face 50 of the 1-R shift control lever 24, the adaptor 49 being secured to the jacket 12 by a bolt 52. The steering column jacket 12 is secured adjacent its lower end in a fixed abutment 54 located just above the upper shift control lever 26. A cylindrical dust shield 56 is mounted in adjacent annular recesses 58 and 60 formed around the cylindrical portions 44 and 45 of the respective shift control levers 24 and 26, the dust shield 56 thereby covering the slots 40 and 42 and the actuating pin 38.

A bearing ring 62 is mounted around the sleeve member 36 intermediate the outer surface 64 of the 2-3 shift control lever 26 and an abutment or collar 66 formed on the jacket an expanded 12. A spring 68 (FIG. 2) is mounted around the control tube 22 between a retainer 70 mounted on the control tube 22 adjacent an expanded control tube portion 72 and an annular groove 74 formed in the adjacent end of the bearing ring 62, serving to urge the retainer 70 and, hence, the control tube 22 and the actuating pin 38 upwardly (to the right in FIG. 2) any time the selector lever 20 is left in Neutral, to engage the 2-3 shift control lever 26.

It should be apparent that the invention provides an improved, efficient lower column shifting arrangment wherein minimal components are utilized, with no adjustment of the axial position of either of the 1-R and 2-3 shift control levers being required.

It should also be apparent that an internal control tube-mounted sleeve member and actuating pin, associated with abutting shift levers, provide a simplified, yet quick acting and virtually wear-free shift lever actuating arrangement. While but one embodiment of the invention has been shown and described, other modifications thereof are possible.

I claim:

1. A shift control arrangement for use on the lower portion of a steering column jacket, said arrangement comprising a control tube reciprocally and rotatably mounted within said steering column jacket, a sleeve member secured to the lower end of said control tube, an actuating pin formed on the outer surface of said sleeve member at an intermediate point therealong, lower and upper shift control levers having respective first and second cylindrical mounting portions mounted freely around said sleeve member, said first and second cylindrical mounting portions having adjacent bearing surfaces bearing against one another, oppositely disposed first and second slots formed in said respective first and second cylindrical mounting portions, said actuating pin extending radially through one of said first and second slots so as to be axially reciprocally movable therebetween for rotating said respective lower and upper shift control levers in response to rotary movement of said control tube, bearing means secured to the end of said steering column jacket and abutting against the outer surface of said lower shift control lever, and spring-loaded support means mounted between the outer surface of said upper shift control lever and a fixed point on said control tube.

2. The shift control arrangement described in claim 1, and a cylindrical dust shield mounted around said adjacent end bearing surfaces of said first and second cylindrical mounting portions, thereby covering said bearing surfaces, said first and second slots and said actuating pin.

3. The shift control arrangement described in claim 1, and a central steering shaft, said bearing means including a bearing mounted on said steering shaft, and a bearing adaptor secured to said bearing, the end face of said bearing adaptor abutting against said outer surface of said lower shift control lever.

4. The shift control arrangement described in claim 1, and first and second abutments formed on said control tube, said spring-loaded support means including a ring member mounted between said outer surface of said upper shift control lever and said first abutment, a spring retainer mounted around said control tube, and a spring mounted between said ring member and said spring retainer for urging said spring retainer against said second abutment to thereby urge said control tube in a direction tending to move said actuating pin into said second slot of said second cylindrical portion.

5. A shift control arrangement for use on the lower portion of a steering column jacket, said arrangement comprising bearing means secured to the end of said steering column jacket, a control tube reciprocally and rotatably mounted within said steering column jacket, a sleeve member secured to the lower end of said control tube, said sleeve member having an end thereof mounted within said bearing means, an actuating pin formed on the outer surface of said sleeve member at an intermediate point therealong, a first ring member rotatably mounted around said sleeve member and bearing against the adjacent end of said bearing means, a second ring member rotatably mounted around said sleeve member and bearing against the adjacent end of said first ring member, a first-reverse shift control lever formed on said first ring member, a second-third shift control lever formed on said second ring member, first and second slots formed in said respective first and second ring members and positioned adjacent one another when said control tube is in the Neutral position, said actuating pin extending radially through at least one of said first and second slots so as to be axially movable therebetween when said control tube is in said Neutral position to thereby rotate said respective first-reverse and second-third shift control levers into selected drive ratios in response to rotary movement of said control tube, and spring-loaded support means mounted between the outer surface of said upper shift control lever and a fixed shoulder formed on said control tube for urging said actuating pin into said second slot when said control tube is in said Neutral position.

* * * * *